United States Patent [19]

Kozyrski et al.

[11] Patent Number: 4,987,814
[45] Date of Patent: Jan. 29, 1991

[54] TURRET ASSEMBLY FOR CUTTING MACHINE HEAD

[75] Inventors: Vincent T. Kozyrski, Plainville; Alan R. Peters, Milford, both of Conn.

[73] Assignee: The Fletcher-Terry Company, Farmington, Conn.

[21] Appl. No.: 216,767

[22] Filed: Jul. 8, 1988

[51] Int. Cl.⁵ .................. C03B 33/07; C03B 33/10; B26D 3/08

[52] U.S. Cl. .................. 83/884; 30/164.95; 225/96.5; 83/549

[58] Field of Search ............ 225/96.5, 103; 30/329, 30/339, 340, 164.9, 164.95; 33/32.3, 44, 18.1; 407/48, 103, 104; 83/862, 863, 864, 881, 882, 883, 884, 549, 552, 698

[56] References Cited

U.S. PATENT DOCUMENTS

| | | | |
|---|---|---|---|
| 1,578,477 | 3/1926 | Smith et al. | 30/292 |
| 3,130,499 | 4/1964 | Hanneken et al. | 33/32.3 |
| 3,151,794 | 10/1964 | Brand | 83/884 |
| 3,165,018 | 1/1965 | Brand | 83/884 |
| 3,889,862 | 6/1975 | Insolio et al. | 225/96.5 |
| 4,227,306 | 10/1980 | Meshulam | 30/339 |
| 4,545,515 | 10/1985 | Kozyrski | 225/96.5 |

FOREIGN PATENT DOCUMENTS 83547  3/1919  Switzerland .................. 30/339

OTHER PUBLICATIONS

Nielsen & Bainbridge Promotional Piece, Paramus, New Jersey 07652 (copyright 1988).

Primary Examiner—Hien H. Phan
Attorney, Agent, or Firm—Ira S. Dorman

[57] ABSTRACT

A turret assembly, having peripheral stations for mounting a glass-cutting wheel, and for mounting two different blades for cutting mat and plastic sheet, is attached to a cutting head by a bolt. With the mounting bolt extended, the turret assembly can be withdrawn from the supporting part and rotated to bring each of the cutting stations into an operative position. Cooperating detent elements ensure reliable indexing of the turret, and tightening of the mounting bolt affixes it in each selected position.

19 Claims, 4 Drawing Sheets

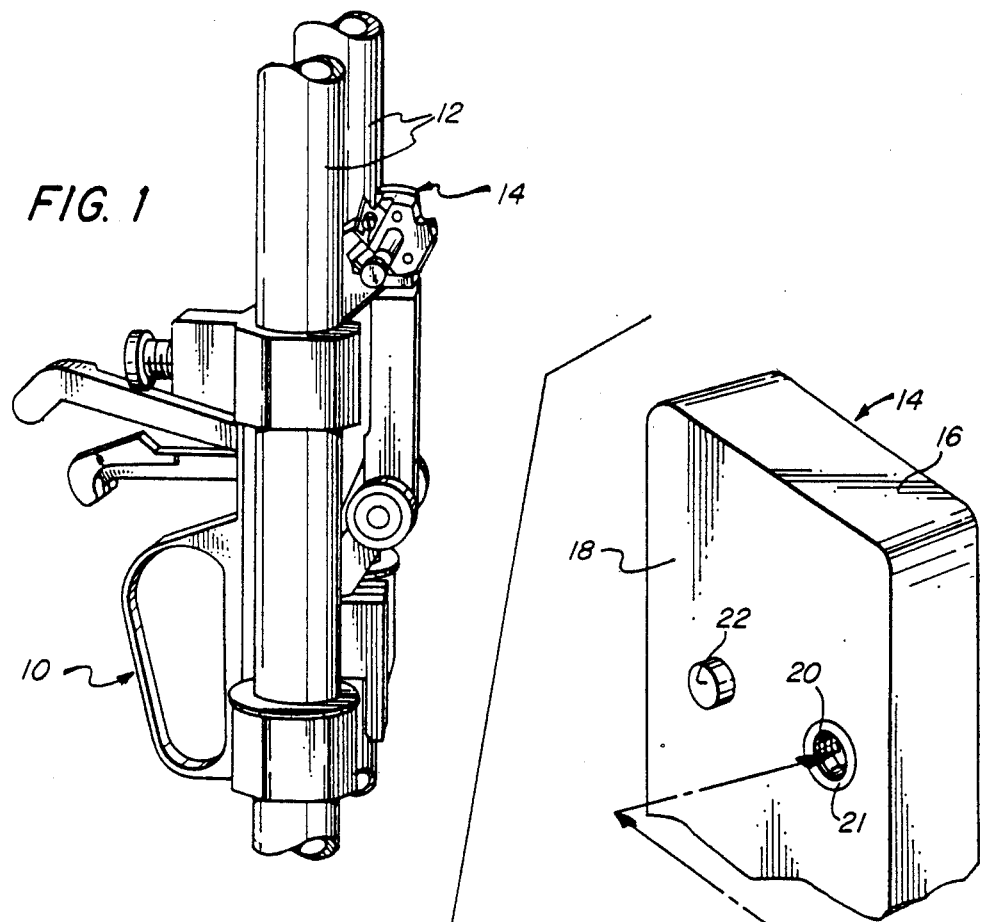
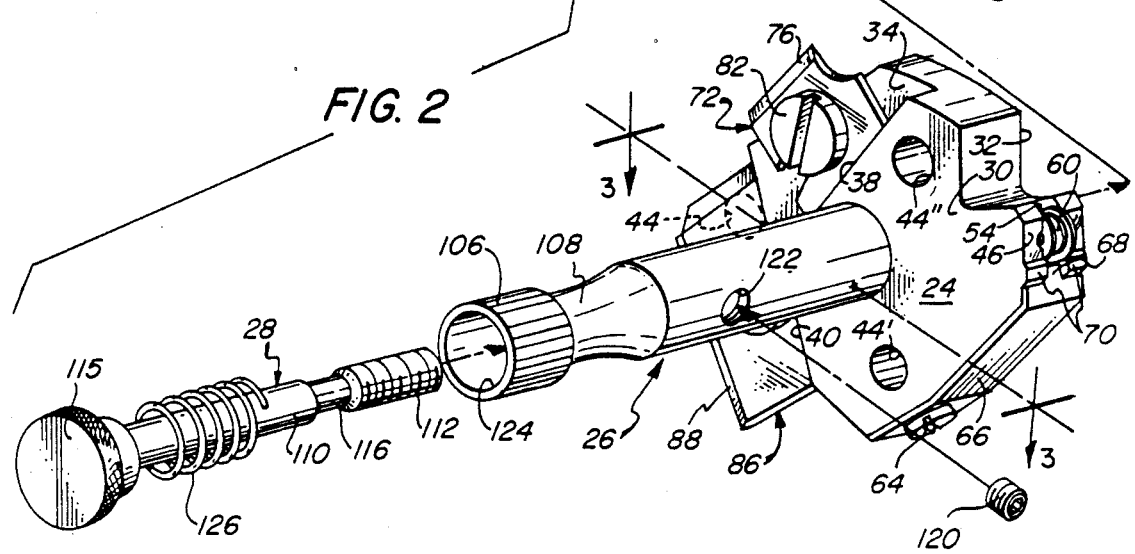

TURRET ASSEMBLY FOR CUTTING MACHINE HEAD

BACKGROUND OF THE INVENTION

A machine for cutting glass, plastic and mat is described in Kozyrski U.S. Pat. No. 4,545,515, issued Oct. 8, 1985, which machine is highly effective for its intended purposes. The cutting head described in the patent is adapted to support an elongated pillar post assembly, and the use of interchangeable posts is taught, one supporting a plastic sheet cutting blade and a glass cutting wheel on its opposite ends, and another supporting a mat cutting blade. Despite the benefits afforded by the head assembly and machine of the Kozyrski patent, added convenience of operation and use would of course be a worthwhile achievement.

Accordingly, it is the broad object of the present invention to provide a novel head for a glass, plastic and mat-cutting machine, and a novel turret assembly for use therein, having a plurality of cutting elements mounted thereon which can selectively be brought into operative position, quickly and easily and without need for removal or replacement of any part.

It is a more specific object of the invention to provide such a cutting head and turret assembly by which the cutting elements are securely held in optimal positions for cutting effectiveness.

Other objects of the invention are to provide a cutting head and assembly having the foregoing features and advantages, which are comprised of relatively few parts and are relatively inexpensive and facile to manufacture.

SUMMARY OF THE INVENTION

It has now been found that certain of the foregoing and related objects of the invention are attained by the provision of a turret assembly which includes a generally planar body portion and a sleeve portion assembled therewith. The body portion has opposite side faces, a central aperture, a plurality of peripheral stations adapted for mounting separate cutting members thereon, and a corresponding plurality of detent elements operatively disposed on one of the faces, each detent element being associated with one of the stations. The sleeve portion extends from the opposite face of the body portion and normal to its plane, and it has a bore which is aligned with the aperture thereof. A mounting bolt, having a head portion and a threaded portion on its opposite ends, is slidably and rotatably received in the bore and aperture of the sleeve and body portions, and means is provided for outwardly biasing the mounting bolt. The assembly cooperates with a cutting head, having means for engaging the threaded portion of the bolt and for engaging the detent elements, to enable indexing to each of a plurality of positions in which the peripheral stations on the body portion are selectively operatively oriented.

In preferred embodiments of the assembly, one of the stations will be defined by a body portion surface element that is depressed from the opposite face, and by an upstanding rectilinear wall that extends along the inner boundary of the surface element. The wall will be so disposed, relative to the associated detent element, as to permit optimal orientation of a cutting member mounted thereat and disposed thereagainst. A single mounting element may be used for mounting the cutting member, and it may comprise an upstanding boss that is centrally disposed on the surface element, with spacing from the rectilinear wall. The blade employed will have a sharpened edge along one margin and a rectilinear edge along the opposite one, and will have an aperture therebetween dimensioned and configured to snugly engage the boss on the body portion, with the aperture and rectilinear edge having the same spacing from one another as the boss and rectilinear wall. As a result, the position of the blade will be established by engagement of the rectilinear edge on the rectilinear wall and of the boss within the aperture. The aperture of the blade will desirably communicate with its rectilinear edge through a relatively narrow channel, so as to define a keyhole slot; and more particularly, the edges of the blade will be parallel, and the channel will lie on an axis that bisects the sharpened edge of the blade, thereby rendering it mountable in alternative positions, inverted endwise about its axis.

A second station on the turret body may be similarly defined by a second depressed surface element and by a second wall extending along the inner boundary thereof, the wall being so disposed, relative to the associated detent element, as to permit optimal orientation of a cutting member mounted thereat. Generally, both of the surface elements will be flat, and will be disposed in different planes parallel to the body portion plane.

A section of the peripheral edge of the body portion will desirably have means for mounting a cutting member thereon, thus providing another station. The peripheral edge section will advantageously be comprised of three adjacent flat surfaces disposed at obtuse angles to one another, with a blind hole extending into an end one of them and with a channel extending therealong and through the blind hole, on a medial plane of the body portion. A ramp element, bent to conform generally to the profile of the peripheral edge section, will be attached on the surface at the opposite end of the edge section, to extend therealong.

The detent elements of the body portion will conveniently comprise holes that are disposed in a circular array concentric with the central aperture, and that open on the "one" face thereof. The sleeve portion and the shaft of the mounting bolt will usually have cooperating means thereon for restricting the axial travel distance, and gripping means will be provided to facilitate axial and rotational movement of the sleeve portion.

Other objects of the invention are attained by the provision of a multipurpose cutting head, comprised of a cutting head body and a removable turret assembly, the latter as hereinabove described. The cutting head body includes a supporting part having a planar surface, a threaded opening, and a detent element, the threaded opening and detent element being operatively disposed on the planar surface and extending normal thereto. The turret assembly is mounted with its "one" face forced by the biasing means against the planar surface of the supporting part, and with the threaded portion of the bolt shaft engaged with the threaded opening thereof; the detent element of the support part is spaced from the opening a distance equal to the radius of the circular array of elements on the turret body. Generally, the detent elements of the turret body portion will be three identical holes, and the detent element will be a stud projecting from the planar surface of the supporting part and dimensioned and configured for snug engagement therewithin.

BRIEF DESCRIPTION OF THE DRAWINGS

FIG. 1 is a perspective view of a cutting head embodying the present invention, mounted upon the guide rails of a sheet-cutting machine, the rails being shown fragmentarily;

FIG. 2 is an exploded perspective view, drawn to a scale greatly enlarged from that of FIG. 1, showing the turret assembly of the invention, and fragmentarily illustrating the supporting part of the cutting head on which the turret assembly is mounted;

DETAILED DESCRIPTION OF THE ILLUSTRATED EMBODIMENT

Figure 3A:
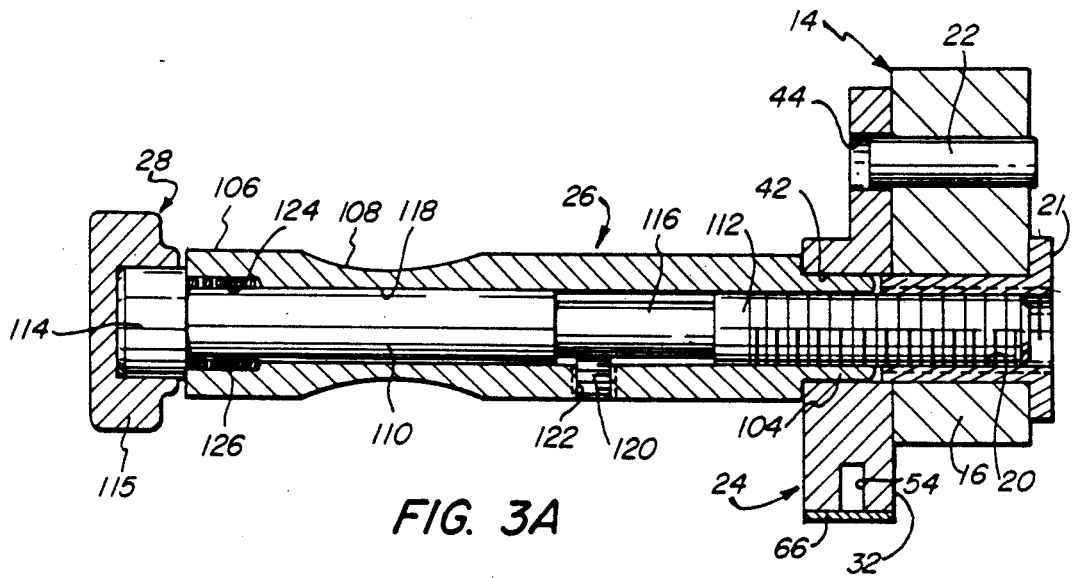
FIG. 3A is a sectional view of the turret assembly and supporting part, taken along line 3—3 of FIG. 2 and drawn to a scale enlarged therefrom.

Turning now in detail to the appended drawings, FIG. 1 shows a cutting head embodying the present invention and generally designated by the numeral 10, slidably mounted upon a pair of parallel tubular guide rails 12 of a sheet-cutting machine. The head 10, and its mechanical environment in a cutting machine, are virtually the same as are disclosed in the above-identified Kozyrski patent, except for the cutting element mounting means that are employed therein, respectively. Accordingly, with the exception noted, the description of that patent is hereby incorporated hereinto by reference thereto, and in particular the portion of the text beginning in column 6 at line 40 through column 10 at line 51, and the corresponding illustrations.

More particularly, and as best seen in FIG. 2 hereof, in the present cutting head the rocker arm, generally designated by the numeral 14, has a flange-like supporting part 16 at its free end, with a generally planar surface 18 on one side. A press-fit bushing 21 provides a threaded opening 20 extending into the supporting part 16, and the tip of a cylindrical dowel pin, or stud 22, projects outwardly therefrom, both on axes that are normal to the surface 18.

The turret assembly of the invention consists of a body portion, generally designated by the numeral 24, a sleeve portion, generally designated by the numeral 26, and a mounting bolt, generally designated by the numeral 28. The body portion 24 has parallel, generally planar faces 30, 32 on its opposite sides, with recessed surface elements 34 and 36 lying in different planes that are depressed from, but parallel to, the face 30. Upstanding rectilinear walls 38, 40 define the inner margins of the two recessed surface elements 34, 36, respectively, and an aperture 42 extends through the body portion 24 in a central location. Three round holes 44, 44', 44" also extend through the body portion 24; they are arranged in a circular array, equiangularly spaced from one another, and the array is concentric with the aperture 42. The holes 44 are of slightly larger diameter than the stud 22, and they are spaced from the aperture 42 by the same distance as exists between the stud 22 and the threaded opening 20. Thus, the stud 22 and holes 44 function cooperatively as detent elements for rotary indexing of the turret assembly.

Three stations are defined on the turret body portion 24, each being specifically adapted to mount a different kind of cutting member, and each being associated with one of the detent holes 44, 44', 44". One station is comprised of a peripheral edge section on which three adjacent flat surfaces 46, 48, 50 are defined, the contiguous ones of which are disposed at obtuse angles to one another. A blind hole 52 extends inwardly from the surface 46, and is bisected by a channel 54 formed into the peripheral edge section at that station and running therealong, on the medial plane of the body portion. Frictionally engaged within the hole 52 and slot 54 is a standard glass-cutting wheel unit, which consists of a U-shaped bracket or clip 56, between the sides of which is rotatably supported, on a short axle 58, a glass-cutting wheel 60; the channel 54 must be sufficiently narrow to securely retain the clip 56 without being so small as to caused binding of the wheel 60.

A threaded bore 62 extends inwardly from the surface 50 and receives a screw 64 for attaching the resilient ramp element 66. The ramp element is bent to conform to the profile of the surfaces 46, 48, 50, and it has a small tang 68 on its free end trapped between the bosses 70 on the surface 48 adjacent the opening of the channel 54. The detent hole 44 is functionally associated with the glass-cutting station.

Figure 7:
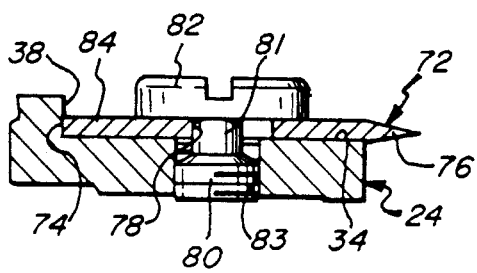
FIG. 7 is an enlarged fragmentary sectional view taken along line 7—7 of FIG. 6.

Recessed surface 34, and the rectilinear wall 38 extending therealong, define a second peripheral station (see especially FIG. 7) on the body portion 24, with which the detent hole 44' is functionally associated. A blade, generally designated by the numeral 72, for cutting plastic is mounted at this station. It is formed with an unsharpened rectilinear edge 74 along one margin, a parallel sharpened edge 76 along an opposite margin, and an angled slot 78 therebetween. For mounting, the blade 72 is slid along the surface 34 with the shaft 80 of a mounting screw 82 (engaged in threaded aperture 83) received in the slot 78, and with the edge 74 disposed along the wall 38. The tapered element 84 defined on the blade 72 will eventually wedge between the wall 38 and the screw shaft 80, in the reduced diameter, thread-free section 81 thereof, thereby ensuring that the sharpened edge 76 will be oriented at a predetermined optimal angle; the screw 82 will of course be tightened to affix the blade 72 in place.

Figure 9:
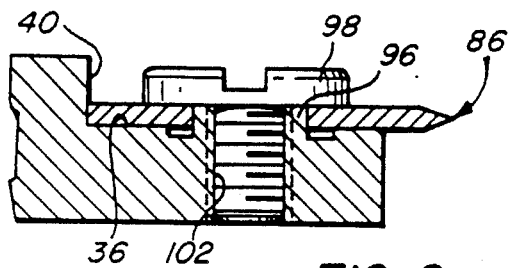
FIG. 9 is an enlarged fragmentary sectional view taken along line 9—9 of FIG. 8.

A mat-cutting blade, generally designated by the numeral 86, is similarly mounted at the third station (see especially FIG. 9) on the body portion 24, with which the detent hole 44" is operatively associated. The blade 86 has a sharpened cutting edge 88 and a parallel opposing rectilinear edge 90; in its properly mounted position the edge 90 bears upon the wall 40, with the blade 86 resting against the surface 36, so as to establish the predetermined optimal orientation of the edge 88.

In this instance, the blade 86 is uniquely formed, with a keyhole slot comprised of a circular portion 92 and a narrower channel portion 94, the latter opening on the edge 90 and lying on an axis that bisects the edge 88. The body portion 24 has a small, short circular boss 94 projecting outwardly of the recessed surface 36, the diameter of which is substantially the same as that of the circular portion 92 of the keyhole slot. The center of the boss 96 and of the circular portion 92 are spaced the same distance from the wall 40 and the edge 90 of the blade, respectively; as a result, the boss and wall will cooperatively locate the mounted blade 86 and also establish it proper orientation. The fastening screw 98 is of course received in the threaded aperture 102 within the boss 96 to fix the blade 86 in place.

It will be appreciated that the surfaces 34 and 36 are at different levels, relative to the face 30, to accommodate the different thicknesses of the blades 72 and 86. This will ensure that their cutting edges will both lie on the medial plane of the body portion 24, as will the edge of the glass-cutting wheel 60.

Figure 3B:
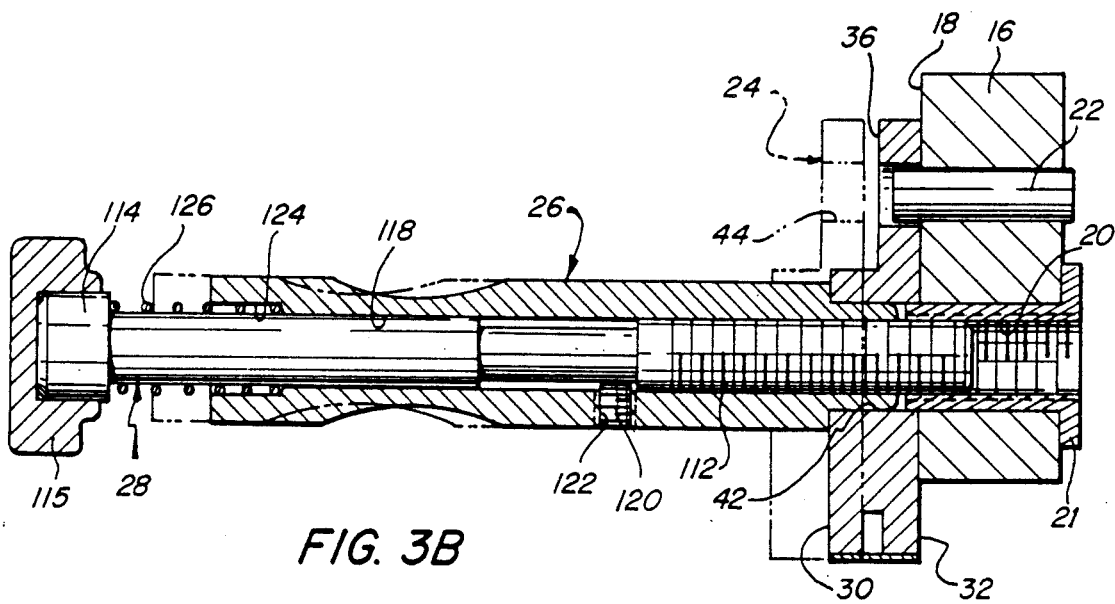
FIG. 3B is a view similar to that of FIG. 3A, showing the mounting bolt of the assembly partially unscrewed from the threaded bushing on the supporting part, and also showing (in full and phantom line, respectively) engaged and disengaged positions of the turret body portion.
Figure 4:
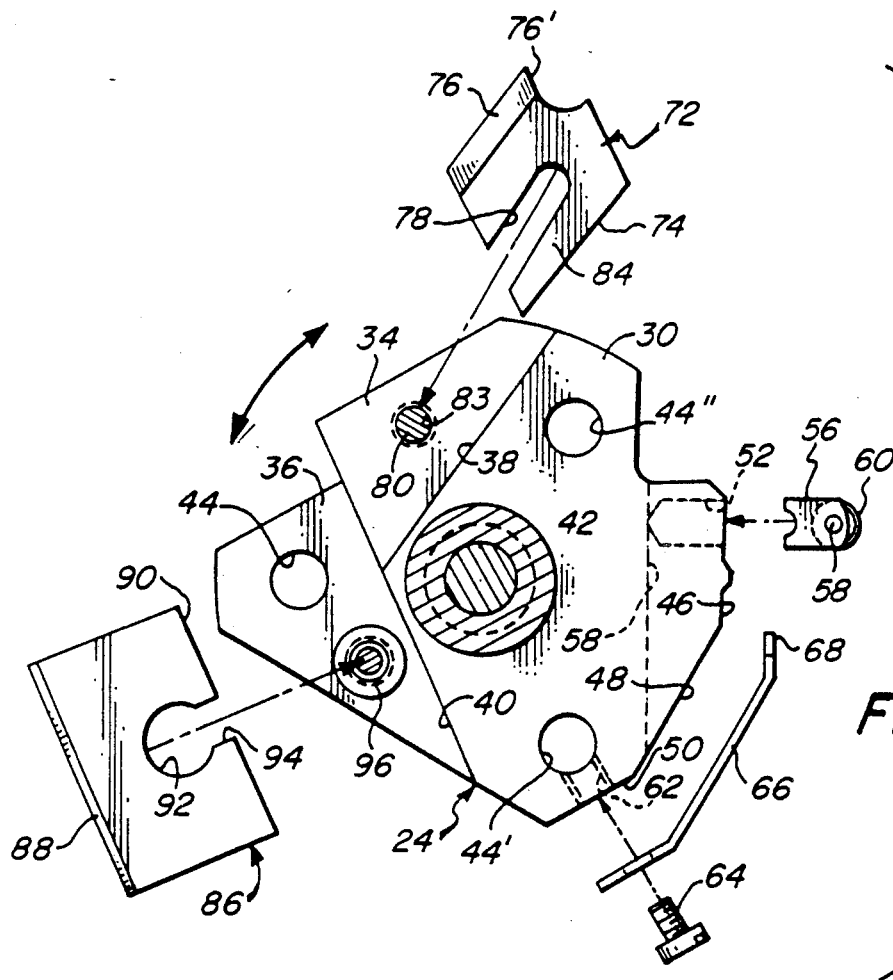
FIG. 4 is an exploded plan view of the turret body portion, and the cutting elements and other components associated therewith.

As best seen in FIGS. 3A and 3B, the sleeve portion 26 of the turret assembly has a reduced diameter end element 104 which is permanently affixed within the aperture 42 of the body portion 24. The sleeve portion has a knurled section 106 at its opposite (free) end, adjacent to which it has a necked-in section 108; these sections provide means for gripping the sleeve portion to facilitate turning and outward axial displacement of the assembly, respectively.

The mounting bolt 28 includes a shaft 110, with a threaded portion 112 on one end and a head portion 114 on the other, the latter being covered by a knurled cap 115. A circumferential channel extends about the shaft 110 adjacent the threaded portion 112, to provide a reduced diameter intermediate portion 116. The bolt 28 is slidably and rotatably received within the bore 118 of the sleeve portion 26, and is of such a length that the threaded portion 112 and the head portion 114 protrude beyond its opposite ends. A set screw 120 is engaged within an aperture 122 formed through the wall of the sleeve portion 26, and is so located as to cause the end of the screw 120 to lie within the channel about the reduced diameter portion 116, when inserted to a sufficient depth. This serves of course to limit outward axial movement of the bolt 26 within the sleeve portion 26, without preventing free relative rotation therebetween. The outer end of the sleeve portion bore 118 is enlarged at 124, and serves to seat one end of a coil spring 126, the opposite end of which bears upon the head portion 114; the spring 126 thus exerts an outward bias upon the bolt 28, relative to the sleeve portion 26.

The unified body and sleeve portions 24, 26 of the turret assembly are mounted upon the supporting part 16 of the cutting head 10 by engagement of the threaded portion 112 of the bolt shaft 110 within the opening 20 of the bushing 21; the outer end of the bushing has an annular flange thereon, to prevent inward disassembly, and the inner end of the bushing is received within the central aperture 42 of the body portion 24.

In the condition shown in FIG. 3A, the assembly is affixed in position on the supporting part, by full tightenting of the bolt, with the glass-cutting wheel 60 (not visible in the Figure) operatively disposed, by virtue of engagement of the detent stud 22 within the detent hole 44. Conditioning the head for cutting a different material, by bringing one of the other two stations into operative position, is achieved simply by loosening of the bolt 28 to provide clearance between the head portion 114 and the adjacent end of the sleeve portion 26. This will permit withdrawal of the body portion 24 from the supporting part 16, so as to disengage the dowel pin 22 from the hole 44 and thereby allow relative rotation of the turret assembly. Then, it is simply a matter of aligning and engaging, with the pin 22, the detent hole (44' or 44") associated with the selected cutting station, and of tightening the bolt 28 to affix the turret assembly in position.

Figure 5:
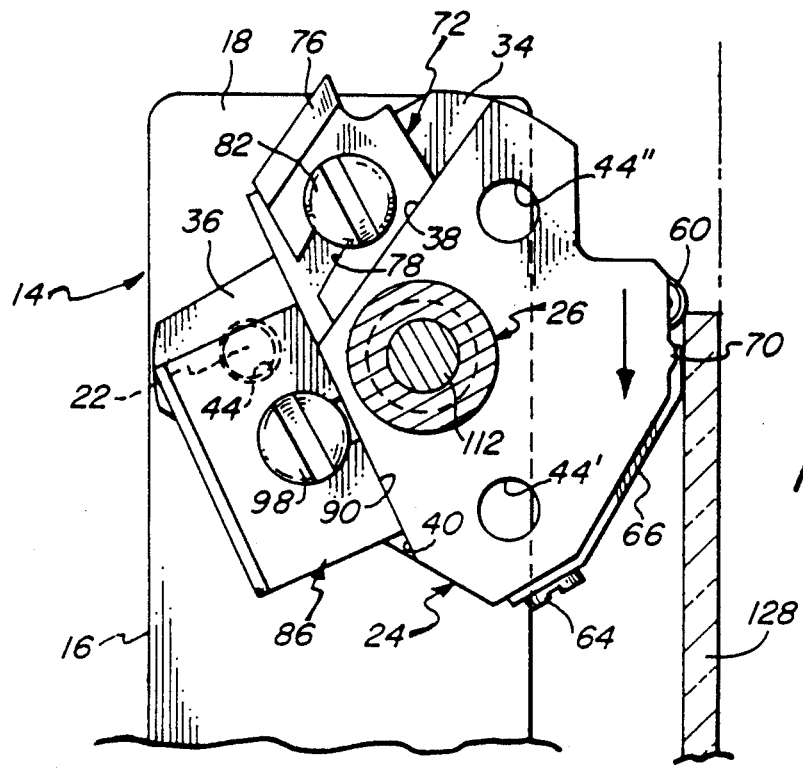
FIG. 5 is a side elevational view of the turret assembly and supporting part of the cutting head, showing the glass cutting wheel in operative position against an edge of a glass sheet, the sleeve portion and mounting bolt of the assembly being shown in section.

The glass-cutting wheel 60 is shown in operative position in FIG. 5, with the direction of movement of the cutting head for scoring of the glass sheet 128 indicated by the arrow. Ramp element 66 serves to provide a lead-in with a shallow approach angle, to protect both the glass-cutting wheel and also the edge of the workpiece from damage.

Figure 6:
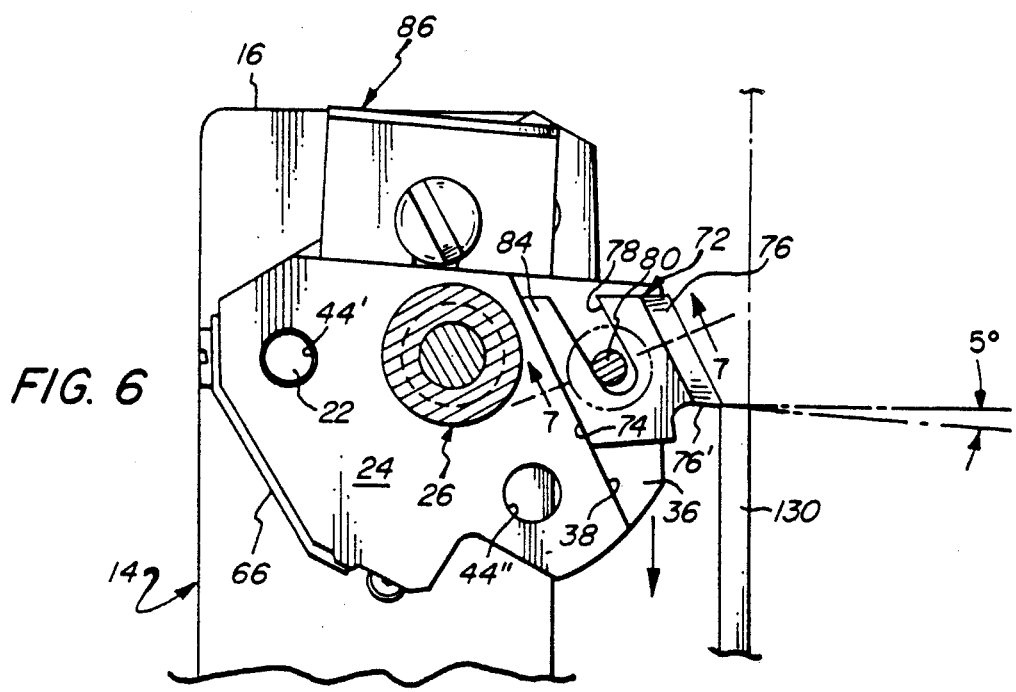
FIG. 6 is a view similar to that of FIG. 5, showing the plastic cutting blade in operative position at the edge of a plastic sheet workpiece.

FIG. 6 shows the turret assembly indexed to bring the plastic cutting blade 72 into operative position for cutting of the plastic sheet 130. The angular relationship between the leading edge 76' and the workpiece is of considerable importance, and will desirably have a value of approximately 95° (i.e., 5° displaced from perpendicular to the plane). If the angle between the edge 76' and the surface of the work is excessive (e.g., 100° or more) there will be a tendency for chattering of the blade to occur, with concomitant roughness of the cut produced; on the other hand, too small of an angle (e.g., 90°) will make cutting difficult. The wall 38 orientation, the fastener 82 and the location of the detent hole 44', cooperate to optimally position the blade 72 so as to achieve smooth and facile cutting of the workpiece 130.

Figure 8:
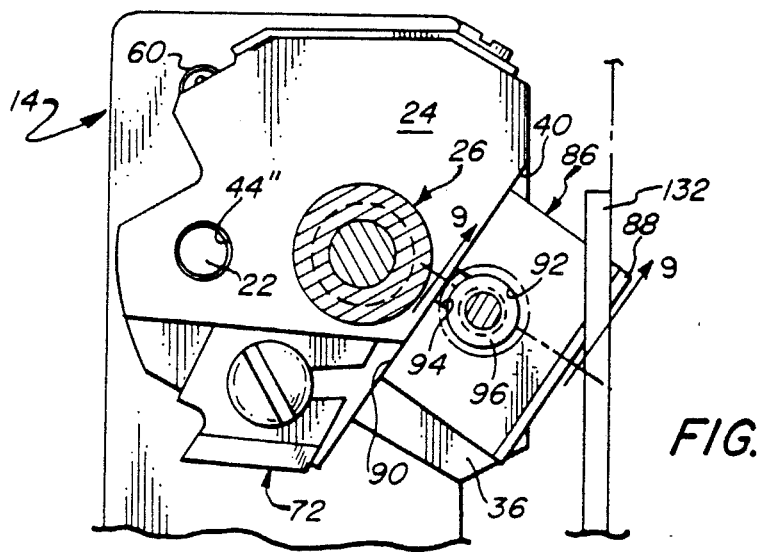
FIG. 8 is another view similar to FIGS. 5 and 6, showing the mat cutting blade in operative position for cutting of a mat workpiece.

Finally, in FIG. 8 the blade 86 is shown in operative position for cutting of the mat 132. Here again, the wall 40, the boss 96 and the associated detent hole 44" cooperate to ensure optimal orientation of the blade 86 (at about 35° to the work surface). As will be appreciated, because the channel 94 of the keyhole slot bisects the sharpened edge 88, the blade 86 may be reversed, endwise about the axis of the channel, to maximize its useful life.

Thus, it can be seen that the present invention provides a novel head for a glass, plastic and mat-cutting machine, and a novel turret assembly for use therein, having a plurality of cutting elements mounted thereon which can selectively be brought into operative position, quickly and easily and without need for removal or replacement of any part. The cutting head and turret assembly enable the cutting elements to be securely held in optimal positions for cutting effectiveness; in addition, they are comprised of relatively few parts, and are relatively inexpensive and facile to manufacture.

Having thus described the invention, what is claimed is:

1. A turret assembly for a multipurpose cutting head, comprising: a generally planar turret body portion having opposite side faces, a central aperture, a plurality of peripheral stations adapted for mounting separate cutting members thereon, and a corresponding plurality of detent elements operatively disposed on one of said faces, one of said detent elements being associated with each of said stations; an elongated sleeve portion extending from the opposite face of said body portion and attached thereto, said sleeve portion extending normal to the plane of said body portion, having a bore therethrough aligned with said aperture thereof, and having a free end with an adjacent section that can be manually gripped; a mounting bolt, including a shaft slidably and rotatably received in said bore and aperture, said shaft having a head portion and a threaded portion at the opposite ends thereof, lying outwardly of and adjacent to said free end of said sleeve portion and of said one face of said body portion, respectively; and means for biasing said mounting bolt away from said body portion, whereby said assembly can be firmly affixed to a supporting part of a cutting head having means for threadably engaging said threaded portion of said shaft and for cooperatively engaging said detent elements, with said assembly clamped thereto by tightening of said bolt to bring said head portion thereof against said free end of said sleeve portion, and can, with said head portion displaced from said free end of said sleeve portion, be indexed manually, by use of said sleeve portion, to each of a plurality of positions thereon in which said peripheral stations are selectively operatively oriented.

2. The assembly of claim 1 wherein said assembly additionally includes a cutting member, and wherein one of said stations is defined by a body portion surface element that is depressed from said opposite face, and by an upstanding rectilinear wall that extends along said surface element and defines an inner boundary thereof, said rectilinear wall being so disposed, relative to the one of said detent elements that is associated with said one station, as to permit optimal orientation of said cutting member, said cutting member being mounted thereat and disposed thereagainst.

3. The assembly of claim 2 wherein said body portion has a mounting element at said one station for mounting said cutting member thereon, said mounting element cooperating with said rectilinear wall to maintain said cutting member at such optimal orientation.

4. The assembly of claim 3 wherein said mounting element comprises an upstanding boss disposed on said surface element with spacing from said rectilinear wall, and wherein said cutting member is a planar blade mounted at said one station, said blade having a sharpened edge along one margin and a rectilinear edge along an opposite margin, and having an aperture therebetween dimensioned and configured to snugly engage said boss on said body portion inserted thereinto, said aperture and rectilinear edge having the same spacing from one another as said boss and rectilinear wall, whereby the position of said blade is established by engagement of said rectilinear edge on said rectilinear wall, and of said boss within said aperture.

5. The assembly of claim 4 wherein said aperture of said blade communicates with said rectilinear edge thereof through a channel that is narrow relative to said aperture, said blade thereby having a keyhole slot formed therein.

6. The assembly of claim 5 wherein said edges of said blade are parallel, and wherein said channel therein lies on an axis that bisects said sharpened edge, thereby rendering said blade mountable at said one station in alternative positions inverted endwise about said axis.

7. The assembly of claim 2 wherein a second of said stations is defined by a second said surface element, and by a second said wall extending along the inner boundary of said second surface element, said wall being so disposed, relative to the one of said detent elements that is associated with said second station, as to permit optimal orientation of said cutting member mounted thereat and disposed thereagainst.

8. The assembly of claim 7 wherein both of said surface elements are flat, and are disposed in different planes parallel to said body portion plane to accommodate flat blades of different thicknesses, with their cutting edges disposed on a medial plane of said body portion.

9. The assembly of claim 1 wherein a section of the peripheral edge of said body portion has means for mounting a cutting member on said edge, said section providing one of said stations.

10. The assembly of claim 9, wherein said mounting means comprises a blind hole extending into said edge.

11. The assembly of claim 10, wherein said section is comprised of three adjacent flat surfaces, contiguous ones of which are disposed at obtuse angles to one another, wherein with said blind hole extends into one of said flat surfaces, wherein said edge is formed with a channel extending therealong and through said blind hole on a medial plane of said body portion, and wherein said body portion has means on the flat surface most remote from said one flat surface for mounting a ramp element thereon.

12. The assembly of claim 11 additionally including an elongate, flexible ramp element bent to conform generally to the profile of said peripheral edge section, said ramp element being attached at one end by said body portion mounting means, and extending therefrom along said flat surfaces.

13. The assembly of claim 1 wherein said detent elements are holes in said body portion, disposed in a circular array concentric with said central aperture and opening on said one face thereof.

14. The assembly of claim 13 wherein said body portion has three of said stations and three of said holes equiangularly disposed therein.

15. The assembly of claim 1 wherein said sleeve portion and shaft have cooperating means thereon for restricting the axial travel distance of said bolt within said sleeve portion.

16. A multipurpose cutting head, comprising a cutting head body and a removable turret assembly; said cutting head body including a supporting part with a planar surface, a threaded opening, and a detent element, said threaded opening and detent element being operatively disposed on said planar surface and extending normal thereto; said turret assembly comprising:

(a) a generally planar turret body portion having opposite side faces, a central aperture, a plurality of peripheral stations adapted for mounting separate cutting members thereon, and a corresponding plurality of detent elements operatively disposed on one of said faces in a circular array concentric with said aperture, and adapted for engagement with said detent element on said supporting part of said head body, one of said detent elements on said body portion being associated with each of said stations;

(b) an elongated sleeve portion extending from the opposite face of said body portion and attached thereto, said sleeve portion extending normal to the plane of said body portion, having a bore therethrough aligned with said aperture thereof, and having a free end with an adjacent section that can be manually gripped;

(c) a mounting bolt, including a shaft slidably and rotatably received in said bore and aperture, said shaft having a head portion and a threaded portion at the opposite ends thereof, lying outwardly of and adjacent to said free end of said sleeve portion and of said one face of said body portion, respectively; and (d) means for biasing said mounting bolt away from said body portion; said turret assembly being mounted on said supporting part of said cutting head with said one face forced by said biasing means against said planar surface thereof, and with said threaded portion of said bolt shaft engaged with said threaded opening of said supporting part, said detent element being spaced from said opening a distance equal to the radius of said circular array, whereby said assembly can be firmly affixed to said supporting part and clamped thereto by tightening said bolt to bring said head portion thereof against said free end of said sleeve portion, and whereby, by drawing said turret body away from said supporting part a sufficient distance to maintain said cooperating detent elements out of interengagement, with said head portion of said bolt displaced from said free end of said sleeve portion, said assembly can be indexed manually, by use of said sleeve portion, to each of a plurality of positions on said supporting part, in which positions said peripheral stations are selectively operatively oriented.

17. The head of claim 16 wherein said detent elements of said turret body portion are identical holes therein opening on said one face thereof, and wherein said detent element of said supporting part is a stud projecting from said planar surface and dimensioned and configured for snug engagement within said holes of said body portion.

18. The head of claim 17 wherein said body portion has three of said stations and three of said holes equiangularly disposed therein.

19. A multipurpose cutting head, comprising a cutting head body and a removable turret assembly; said cutting head body including a supporting part with a planar surface, a threaded opening, and a detent element, said threaded opening and detent element being operatively disposed on said planar surface and extending normal thereto; said turret assembly comprising:

(a) a generally planar turret body portion having opposite side faces, a central aperture, a plurality of peripheral stations adapted for mounting separate cutting members thereon, and a corresponding plurality of detent elements operatively disposed on one of said faces in a circular array concentric with said aperture, and adapted for engagement with said detent element on said supporting part of said head body, one of said detent elements on said body portion being associated with each of said stations;

(b) an elongated sleeve portion extending from the opposite face of said body portion and attached thereto, said sleeve portion extending normal to the plane of said body portion, having a bore therethrough aligned with said aperture thereof, and having a free end with adjacent gripping means for facilitating axial and rotational movement of said turret assembly;

(c) a mounting bolt, including a shaft slidably and rotatably received in said bore and aperture, said shaft having a head portion and a threaded portion at the opposite ends thereof, lying outwardly of said free end of said sleeve portion and of said one face of said body portion, respectively; and (d) means for biasing said mounting bolt away from said body portion; said turret assembly being mounted on said supporting part of said cutting head body with said one face of said turret body portion forced by said biasing means against said planar surface of said supporting part, and with said threaded portion of said bolt shaft engaged with said threaded opening of said supporting part, said detent element being spaced from said opening a distance equal to the radius of said circular array, whereby, by drawing said turret body portion away from said supporting part a sufficient distance to maintain said cooperating detent elements out of interengagement, said assembly can be indexed manually, by use of said gripping means, to each of a plurality of positions on said supporting part, in which positions said peripheral stations are selectively operatively oriented.

* * * * *